(12) United States Patent
Verma

(10) Patent No.: US 9,531,556 B2
(45) Date of Patent: Dec. 27, 2016

(54) SUPPORTING LOW LATENCY APPLICATIONS AT THE EDGE OF WIRELESS COMMUNICATION NETWORKS

(71) Applicant: International Business Machines Corporation, Armonk, NY (US)

(72) Inventor: Dinesh Verma, New Castle, NY (US)

(73) Assignee: International Business Machines Corporation, Armonk, NY (US)

(*) Notice: Subject to any disclaimer, the term of this patent is extended or adjusted under 35 U.S.C. 154(b) by 85 days.

(21) Appl. No.: 14/668,285

(22) Filed: Mar. 25, 2015

(65) Prior Publication Data

US 2016/0285643 A1   Sep. 29, 2016

(51) Int. Cl.
*H04L 12/721* (2013.01)
*H04L 12/18* (2006.01)
*H04W 28/02* (2009.01)
*H04L 12/823* (2013.01)

(52) U.S. Cl.
CPC .......... *H04L 12/1886* (2013.01); *H04L 45/38* (2013.01); *H04L 47/32* (2013.01); *H04W 28/0215* (2013.01)

(58) Field of Classification Search
CPC ...... H04L 45/38; H04L 47/32; H04W 28/0215
See application file for complete search history.

(56) References Cited

U.S. PATENT DOCUMENTS

| | | | |
|---|---|---|---|
| 6,975,626 B1 | 12/2005 | Eberle et al. | |
| 7,958,457 B1 | 6/2011 | Brandenberg et al. | |
| 8,170,491 B2 | 5/2012 | Shuman et al. | |
| 8,229,899 B2 | 7/2012 | Anderson et al. | |
| 8,605,578 B1* | 12/2013 | Govindaraju | H04L 1/1838 370/229 |
| 2002/0031086 A1* | 3/2002 | Welin | G10L 25/78 370/229 |
| 2002/0138643 A1* | 9/2002 | Shin | H04L 47/10 709/232 |

(Continued)

OTHER PUBLICATIONS

Salkintzis, A., et al., "WLAN-GPRS Intergration for Next-Generation Mobile Data Networks," IP Multimedia in Next-Generation Mobile Networks: Services, Protocols, and Technologies, IEEE Wireless Communications, Oct. 2002, pp. 1-13.

*Primary Examiner* — Khaled Kassim
*Assistant Examiner* — Syed S Ali
(74) *Attorney, Agent, or Firm* — Fleit Gibbons Gutman Bongini Bianco; Thomas S. Grzesik

(57) ABSTRACT

Various embodiments manage data flow between at least one wireless communication device and at least one application executing at an edge of the wireless communication network. In one embodiment, a first flow regenerator disposed within the network generates a replicated set of data packets. The replicated set of data packets are a copy of a set of data packets being transmitted between an application disposed on a first node at an edge of the network and a wireless communication device. The first flow regenerator sends the replicated set of data packets to a second flow regenerator disposed in the network. The replicated set of data packets are sent to the second flow regenerator through at least a second node disposed between the first flow regenerator and the second flow regenerator. The second node is configured to perform one or more book-keeping operations on the replicated set of data packets.

9 Claims, 5 Drawing Sheets

(56) References Cited

U.S. PATENT DOCUMENTS

| | | | |
|---|---|---|---|
| 2008/0259799 A1* | 10/2008 | van Beek | H04L 47/2416 |
| | | | 370/235 |
| 2008/0267184 A1* | 10/2008 | Arisoylu | H04L 41/0896 |
| | | | 370/391 |
| 2011/0122883 A1 | 5/2011 | Pacella et al. | |
| 2011/0134909 A1* | 6/2011 | Huang | H04L 1/0009 |
| | | | 370/352 |
| 2012/0069842 A1* | 3/2012 | Reddy | H04L 49/602 |
| | | | 370/388 |
| 2012/0170585 A1* | 7/2012 | Mehra | H04L 45/24 |
| | | | 370/400 |
| 2012/0297249 A1 | 11/2012 | Yang et al. | |
| 2013/0173243 A1 | 7/2013 | Kayton et al. | |
| 2014/0198687 A1* | 7/2014 | Raleigh | H04L 67/306 |
| | | | 370/259 |
| 2014/0373124 A1* | 12/2014 | Rubin | H04L 67/28 |
| | | | 726/7 |
| 2016/0043963 A1* | 2/2016 | Oran | H04L 47/722 |
| | | | 370/231 |

\* cited by examiner

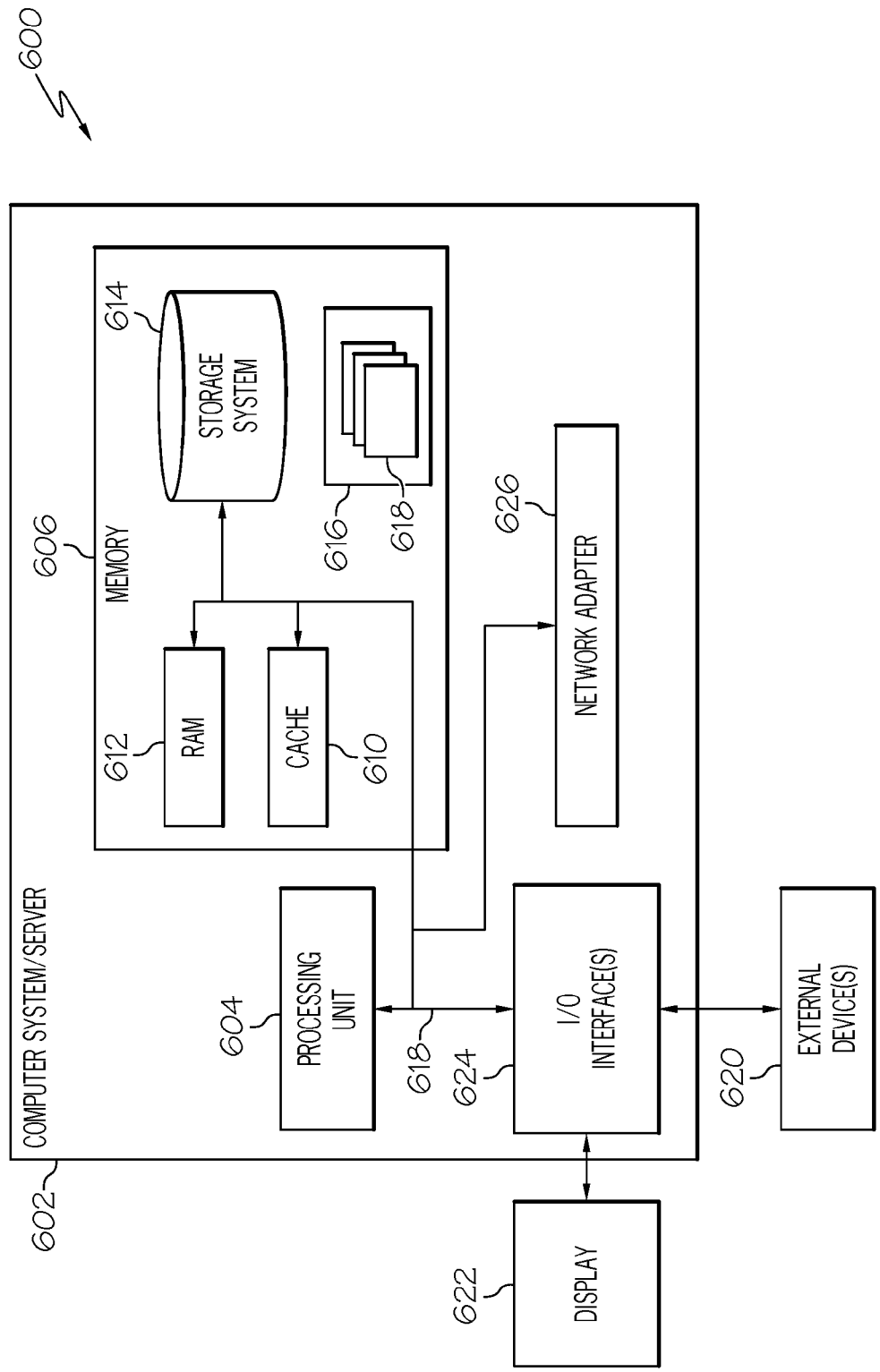

SUPPORTING LOW LATENCY APPLICATIONS AT THE EDGE OF WIRELESS COMMUNICATION NETWORKS

BACKGROUND

The present disclosure generally relates to wireless communication networks, and more particularly relates to supporting low latency application at the edge of wireless communication networks.

Demand for wireless services is increasing rapidly as evident by the tremendous growth in recent years in smart mobile phones. This explosive growth in data traffic and its bandwidth requirements have already saturated the current generation of cellular networks and will continue to pose a major bandwidth challenge for next generation of cellular networks. Thus, while next generation networks will have greater capacity than current networks, they will carry significantly larger data traffic over both the radio and the backhaul links.

BRIEF SUMMARY

In one embodiment, a method for managing data flow between at least one wireless communication device and at least one application executing at an edge of a wireless communication network is disclosed. The method comprises generating, by a first node disposed at an edge of the wireless communication network, a replicated set of data packets. The replicated set of data packets are a copy of a set of data packets being transmitted between an application disposed on a first node at an edge of a wireless communication network and a wireless communication device. The first node sends the replicated set of data packets to a second node disposed in the wireless communication network. The replicated set of data packets is sent to the second node through at least a third node disposed between the first node and the second node. The third node is configured to perform one or more book-keeping operations on the replicated set of data packets.

In another embodiment, a system for managing data flow between at least one wireless communication device and at least one application executing at an edge of a wireless communication network is disclosed. The system comprises an information processing disposed at an edge of the wireless communication network. The information processing system comprises memory and a processor that is communicatively coupled to the memory. The information processing system further comprises at least one application and a first flow regenerator. The first flow regenerator is communicatively coupled to the memory, the processor, and the application, and is configured to perform a method. The method comprises generating a replicated set of data packets. The replicated set of data packets are a copy of a set of data packets being transmitted between the application and a wireless communication device. The replicated set of data packets is sent to a second flow regenerator disposed in the wireless communication network. The replicated set of data packets is sent to the second flow regenerator through at least a node disposed between the first and second flow regenerators. The node is configured to perform one or more book-keeping operations on the replicated set of data packets.

In yet another embodiment, a computer program product for managing data flow between at least one wireless communication device and at least one application executing at an edge of a wireless communication network is disposed. The computer program product comprises a storage medium readable by a processing circuit and storing instructions for execution by the processing circuit for performing a method. The method comprises generating, by a first node disposed at an edge of the wireless communication network, a replicated set of data packets. The replicated set of data packets are a copy of a set of data packets being transmitted between an application disposed on a first node at an edge of a wireless communication network and a wireless communication device. The first node sends the replicated set of data packets to a second node disposed in the wireless communication network. The replicated set of data packets is sent to the second node through at least a third node disposed between the first node and the second node. The third node is configured to perform one or more book-keeping operations on the replicated set of data packets.

In a further embodiment, a method for managing data flow between at least one wireless communication device and at least one application executing at an edge of a wireless communication network is disclosed. The method comprises generating, by a first node disposed at an edge of the wireless communication network, a regeneration request directed to a first flow regenerator disposed within the wireless communication network. The first flow regenerator receives this regeneration request and generates a replicated set of data packets that are a copy of a set of data packets being transmitted between an application disposed on the first node at an edge of the wireless communication network and a wireless communication device. The first flow regenerator node sends the replicated set of data packets to a second first flow regenerator disposed in the wireless communication network. The replicated set of data packets is sent to the second first flow regenerator through at least a second node disposed between the first flow regenerator and the second first flow regenerator. The second node is configured to perform one or more book-keeping operations on the replicated set of data packets.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 6 is a block diagram illustrating one example of an information processing system according to one embodiment of the present disclosure.

DETAILED DESCRIPTION

Technologies such as ASPN (Application & Service Platform for Networks) Cisco Fog Computing, and Carnegie Mellon University Cloudlet technology allow applications to be executed at the edge of a cellular network, e.g. at a cell-tower. A key benefit of these technologies is the support of low latency applications. However, this benefit generally cannot be realized due to existing constraints in the network such as the requirement to have complex book-keeping functions within the network. Examples of such book-keeping functions are legal interception capabilities (required in some geographies) and the need to manage charging for data volume.

The basic challenge in running low latency applications is that the book-keeping functions like charging and legal interception functions are too complex or entwined with other functions performed in the core of the network to be moved to the edge. However, embodiments of the present disclosure overcome this problem by running the server component of applications at the low latency edge and generating a copy of the application traffic on the portion of the network configured to perform the function of legal interception and charging. This replicated traffic is subsequently eliminated from the network by a device situated within the network. In one or more additional embodiments, a separate device is implemented within the network to reduce the amount of traffic that flows through a bottleneck link in the network. This embodiment allows for book-keeping functions that operate by only observing or monitoring content on a network flow, without modifying the actual interaction between users. Therefore, embodiments of the present disclosure provide support for low latency applications at the edge of a wireless communication network without pushing complexity to the edge.

Figure 1:
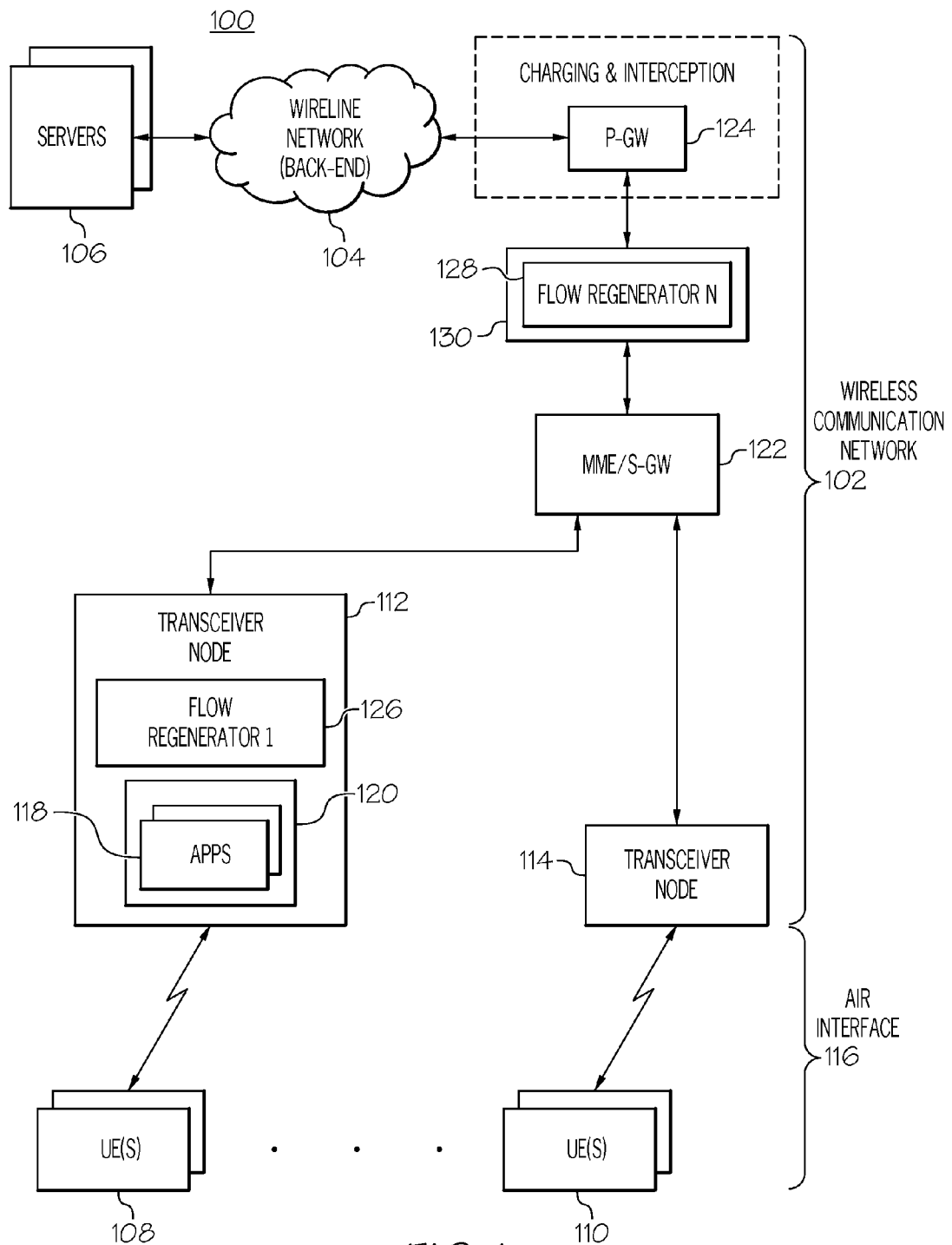
FIG. 1 is a block diagram illustrating one example of an operating environment according to one embodiment of the present disclosure.

FIG. 1 shows an operating environment 100 according to one embodiment of the present disclosure. The operating environment 100 comprises one or more wireless communication networks 102 that are communicatively coupled to one or more wire line networks 104. For purposes of simplicity, only the portions of these networks that are relevant to embodiments of the present disclosure are described. The wire line network 104 acts as a back-end for the wireless communication network 102. In this embodiment, the wire line network 104 comprises one or more access/core networks of the wireless communication network 102 and one or more Internet Protocol (IP) networks such as the Internet. The wire line network 104 communicatively couples, for example, one or more content sources/providers, such as a server(s) 106, to the wireless communication network 102. In further embodiments, the back-end is not a wire line network. For example, in one embodiment the back-end is a wireless network and takes the form of a point-to-point back-end network such as a directional microwave network used to transmit and receive signals bi-directionally. Alternatively, the back-end takes the form of a network of peers in which a mobile base station (e.g., eNodeB in the case of GSM and its descendants) is itself used as a back-end network for other base stations.

The wireless communication network 102 supports any wireless communication standard such as, but not limited to, Global System for Mobile Communications (GSM), Code Division Multiple Access (CDMA), Time Division Multiple Access (TDMA), General Packet Radio Service (GPRS), Frequency Division Multiple Access (FDMA), Orthogonal Frequency Division Multiplexing (OFDM), or the like. The wireless communication network 102 includes one or more networks based on such standards. For example, in one embodiment, the wireless communication network 102 comprises one or more of a Long Term Evolution (LTE) network, LTE Advanced (LTE-A) network, an Evolution Data Only (EV-DO) network, a General Packet Radio Service (GPRS) network, a Universal Mobile Telecommunications System (UMTS) network, and the like. In the example of FIG. 1, the wireless communication network 102 is an LTE network.

FIG. 1 further shows that one or more user devices (also referred to herein as "user equipment (UE)") 108, 110 are communicatively coupled to the wireless communication network 102. The UE devices 108, 110, in this embodiment, are wireless communication devices such as two-way radios, cellular telephones, mobile phones, smartphones, two-way pagers, wireless messaging devices, wearable computing devices, laptop computers, tablet computers, desktop computers, personal digital assistants, and other similar devices. UE devices 108, 110 access the wireless communication network 102 through one or transceiver nodes 112, 114 situated at the edge of the wireless communication network 102. For example, the UE devices 108, 110 access the wireless communication network 102 through one or more transceiver nodes 112, 114 using one or more air interfaces 116 established between the UE devices 108, 110 and the transceiver nodes 112, 114.

In another embodiment, one or more UE devices 108, 110 access the wireless communication network 102 via a wired network and/or a non-cellular wireless network such as, but not limited to, a Wireless Fidelity (WiFi) network. For example, the UE devices 108, 110 can be communicatively coupled to one or more gateway devices via wired and/or wireless mechanisms that communicatively couples the UE devices 108, 110 to the wireless communication network 102. This gateway device(s), in this embodiment, communicates with the wireless communication network 102 via wired and/or wireless communication mechanisms.

The UE devices 108, 110 interact with the wireless communication network 102 to send/receive voice and data communications to/from the wireless communication network 104. For example, the UE devices 108, 110 are able to wirelessly request and receive data/content (e.g., audio, video, text, web pages, etc.) from applications 118 executing at the edge of the wireless communication network 102 and/or from a provider, such as the server 106, through the wireless communication network 102. The requested content/service is delivered to the wireless communication network 102 directly from one or more transceiver nodes 112, 114 or through the wire line network 104.

A transceiver node 112, 114 is known as a base transceiver station (BTS), a Node B, and/or an Evolved Node B (eNodeB) depending on the technology being implemented within the wireless communication network 104. Throughout this discussion a transceiver node 112, 114 is also referred to as a "base station". In one embodiment, one or more base stations 112, 114 comprise applications 118 executing within a computing environment 120 of the base station 112, 114. The computing environment 120 can be a physical computing environment or a virtualized computing environment. Examples of virtualized computing environments 120 include virtual machines and containers. A virtual machine is an emulation of a given computing system (hardware and software) and operates based on the architecture and functions of the given computing system. A virtual machine comprises its own operating system that is separate from the operating system of the host machine. A container is an operating system level virtualization where the kernel of the operating system allows for multiple isolated user space instances instead of just one. A container does not require a separate operating system from that of its host. Containers utilize the kernel's functionality and resource isolation along with separate namespaces to completely isolate an application's view of the operation system.

By having applications available at the edge (e.g., the base stations 112, 114) of the network 102, the latency experienced by users when accessing applications typically made available deeper within the system (e.g., at the backend wireline network 104 or at the IP network) can be greatly reduced. In one embodiment, the base stations 112, 114 implement a computing environment that executes applications and services at the base stations 112, 114 instead further within the network(s), which, alleviate the results of congestion or high latency within the cellular network. Examples of this type of computing environment include (but are not limited to) Application & Service Platform for Networks, Cisco Fog Computing, and Carnegie Mellon University Cloudlet technology. In this embodiment, the base stations 112, 114 extract IP packets and perform functions such as caching. The base stations 112, 114 can support a variety of applications such as applications that observe the IP packets and generate events when they see specific patterns in these packets. Another category of applications compresses the packets that are flowing on the network to save on bandwidth in the cellular backhaul. A third category of these applications can terminate the Transmission Control Protocol (TCP) sessions of the application, allowing some of the server based functions to be delivered from the ASPN platform implemented by the base stations 112, 114 with a very low latency to the client.

The base stations 112, 114 are communicatively coupled to one or more antennas that communicate directly with the core of the wireless communication network 102. It should be noted that in another embodiment, a radio network controller (RNC) or base station controller (BSC) is communicatively coupled to a base station 112, 114 for managing and controlling one or more base stations. In the example shown in FIG. 1 one or more mobility management entities and serving gateway nodes (MME/S-GW) 122 are communicatively coupled to the plurality of base stations 112, 114. A packet gateway node (P-GW) 124 is communicatively coupled to the MME/S-GW 122 and to the wire line network 104 (e.g., Core IP Network). It should be noted that even though FIG. 1 shows the MME combined with the S-GW, the MME can be separate and distinct from the S-GW. It should be noted that the MME/S-GW is also referred to herein as the "MME 122". The MME/S-GW 122 manages mobility (e.g., a transfer) of the UE devices across different base stations 112, 114 and also acts as a serving gateway for data. The P-GW 124 acts as the gateway to the wire line network 104.

In one example, the communication protocols between the UE devices 108, 110 and the P-GW 124 are various 3rd Generation Partnership Project (3GPP) protocols over which the internet protocol (IP) traffic from the UE devices 108, 110 is tunneled. For example, a GPRS tunneling protocol (GTP) is utilized between the base stations 112, 114 and the MME/S-GW 122 as well as between the MME/S-GW 122 and the P-GW 124. A standard Internet Protocol (IP) is utilized between the P-GW 124 and the wire line network 104. The server(s) 106 has a TCP (Transmission Control Protocol) socket that communicates with a TCP socket at the UE devices 108, 110 when a user wishes to access data from the server 106. An IP tunnel is created from the P-GW 124 to UE devices 108, 110 for user traffic and passes through the interim components, such as the MME/S-GW 122. It should be noted that even though LTE components are illustrated in FIG. 1 embodiments of the present disclosure are applicable to other wireless communication technologies as well.

As discussed above, the base stations 112, 114 are able to execute and provide access to various types of applications as compared to these applications being provided by a server 106 behind an IP-based network. However, applications that provide book-keeping functions generally require several complex rules that make these applications very heavy-weighted and sophisticated. Therefore, book-keeping applications and their functions such as legal interception and charging are generally implemented within appliances that are running in either the wireless communication network (cellular network) 102 or the operator IP network, depending on the design of the network by an operator. For some operators, even if the book-keeping applications are not heavy-weighted, moving them from their pre-installed locations would require making several significant changes to the software performing other functions like network management or billing in the network. These appliances receive a copy of the data and/or voice packet flowing through the network, and perform their functions on the received packet. In one embodiment, the P-GW 124 performs the book-keeping operations such as generating charging data records (also referred to as call detail records and "CDRs") and data or voice interception. It should be noted that book-keeping operations may also be performed in or distributed across various other components of the wireless communication network 102 such as the MME or S-GW.

A CDR is a formatted measure of a UE's service usage information (placing a phone call, accessing the Internet, etc.). For example, a CDR includes information related to a telephone voice or data call such as (but not limited to) the origination and destination addresses of the call; the time the call started and ended; the duration of the call; the time of day the call was made; call termination and error codes; and other details of the call. A CDR also comprises some (partial) information about which network elements handled the particular call including, but not limited to, source cell site identifiers and destination cell site identifiers. A CDR is typically generated by one or more network functions that supervise, monitor, and/or control network access for the device, such as the S-GW 122 or P-GW 124 or, in a UMTS system, the mobile switching center (MSC) for voice calls and the Serving GPRS (SGSN) for data calls.

Figure 2:
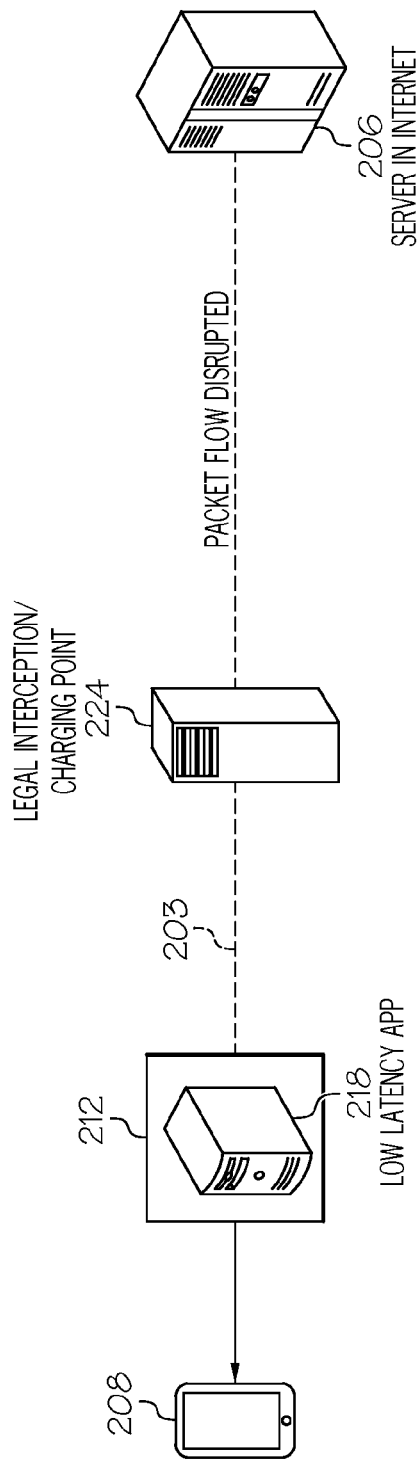
FIG. 2 is a diagram illustrating data packet flow for low latency applications executing at the edge of a wireless communication network.

One problem that arises with the category of applications that terminate TCP session of an application at the base station 112, 114 is that book-keeping operations cannot be performed because the appliances performing these operations do not receive the required data/voice packets. The data/voice packets remain at the edge of the wireless communication network 102, as shown in FIG. 2. In particular, FIG. 2 shows that packets flow between the UE 208 and the base station 212, while the packet flow required by the book-keeping appliances 224 is disrupted as shown by the dashed lines 203.

Therefore, one or more embodiments, dispose a first flow regenerator 126 (FIG. 1) between the UEs 108, 110 and the book-keeping appliances 124 and a second flow regenerator 128 between the book-keeping appliances 124 and a public IP network such as the Internet. The first flow regenerator 126 can be disposed within or outside of a base station 112, 114. The second flow regenerator 128 can be disposed within a book-keeping appliance 124 or within a separate information processing system 130 communicatively coupled to the appliance 124.

Figure 3:
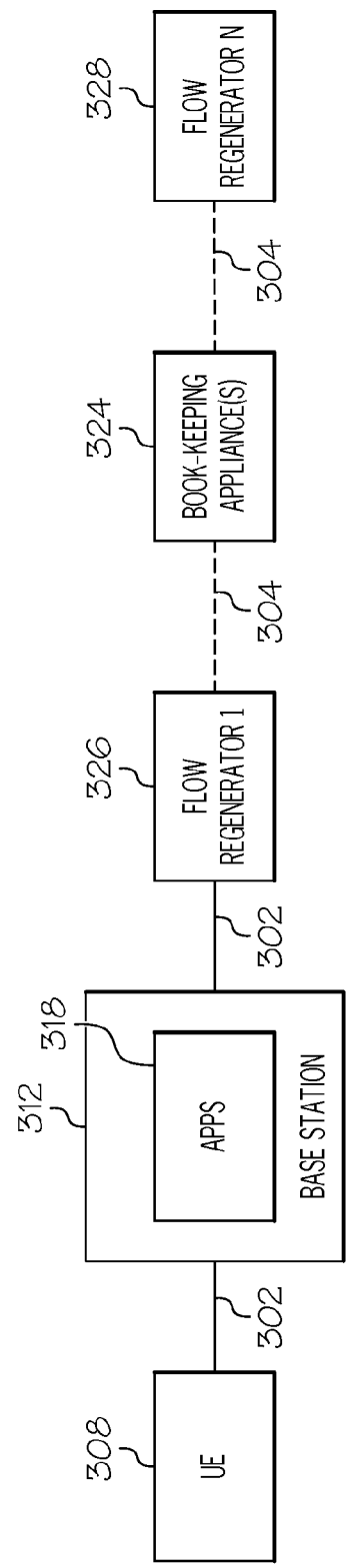
FIG. 3 is a diagram illustrating data packet flow for data packets regenerated for low latency applications executing at the edge of a wireless communication network according to one embodiment of the present disclosure.

In one embodiment, the first flow regenerator 126 generates a copy of the data/voice IP packets that are being sent or received from the application(s) 118 running in its base station 112, 114. In one embodiment, the first flow regenerator 126 copies the packets by performing one or more sniffing operations directed to the applications 118. However, other mechanisms for obtaining and copying the packets are applicable as well. The first flow regenerator 126 repeats and sends the stream of IP packets that were received from the client on the network to the second flow regenerator 128, as shown in FIG. 3. In particular, FIG. 3 shows that an IP data packet stream 302 has been generated based on the UEs 308 interaction with an application 318 executing at the base station 312. The first flow regenerator 326 detects and copies the IP data packet stream 302, and sends a copy 304 of this data packet stream 302 to the second flow regenerator 328. One or more book-keeping appliances 324 are disposed between the first and second flow regenerators 326, 328 and, therefore, receive the copy 304 of the data packet stream 302. Once the second flow regenerator 328 receives the copy of the data packet stream 302 it removes this copy from the network.

Figure 4:
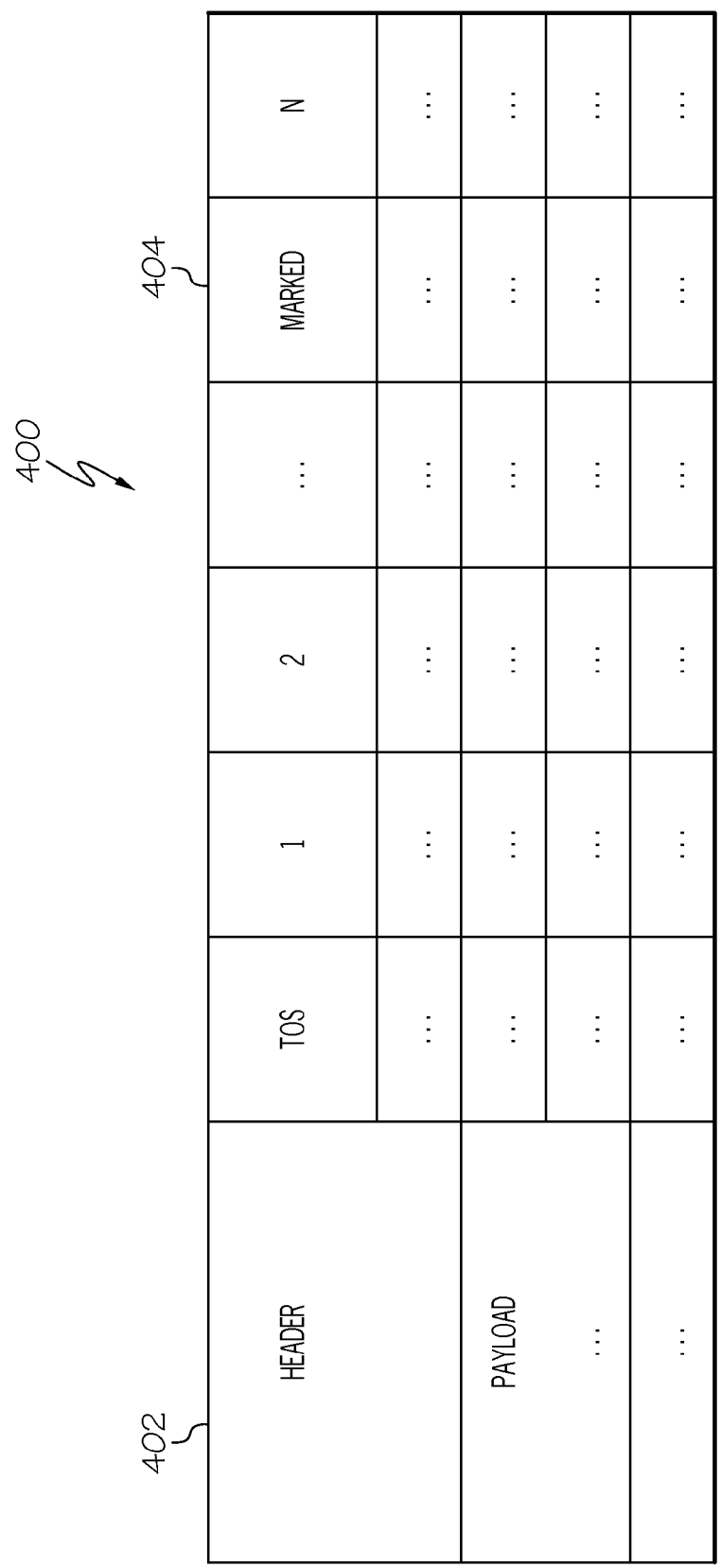
FIG. 4 illustrates a data packet header having been modified to indicate to a flow regenerator that the packet is to be removed from the wireless communication network according to one embodiment of the present disclosure.

In one embodiment, the first flow regenerator 126 marks the packets so that the second flow regenerator 128 can identify and remove the copied packets from the network. For example, FIG. 4 shows that the first flow regenerator 126 changed the Type of Service (TOS) bit 402 in the header 404 of a copied IP packet 400 to a predefined value recognizable by the second flow regenerator 128. It should be noted that any of the unused fields in the IP header and/or UDP header of the packet can also be marked by the first flow regenerator 126. When the IP packet is received by the second flow regenerator 128, the second flow regenerator 128 detects the value added/changes by the first flow regenerator 128 within the header of the packet. Based on detecting this predetermined value, the second flow regenerator 128 removes the packet from the network. Alternatively, the first flow regenerator can introduce a private IP option into a copied packet that indicates to the second flow regenerator 128 that the packet is to be removed from the network. A private IP option is a special additional field that can be introduced as an extension to traditional IP headers. The presence of this field allows the second flow regenerator 128 to identify and remove the regenerated packets.

The role is reversed for packets flowing from the second flow regenerator 128 to the first flow regenerator 126. For example, in response to the packets that the second flow regenerator 128 obtains from the first flow regenerator 126, the second flow regenerator 128 may also generate some packets. While the first flow regenerator 126 is trying to mimic the behavior of original client on the UE 108 or UE 110, the second flow regenerator 128 is trying to mimic the behavior of the application running on servers 106. By regenerating the exact set of flows between themselves, the first and second flow regenerators 126, 128 provide the illusion to the book-keeping applications that network is behaving exactly as it would if the base station 112, 114 (or other edge node executing the applications 118) were not handling the packets in between. In another embodiment, instead of reacting to packets sent from the first flow regenerator 126, the base station 112, 114 (or other edge node executing the applications 118) sends a request to the second flow regenerator 128 such as the link to the web page a UE was trying to download. The base station 112, 114 (or other edge node executing the applications 118) can then send the packets that would have been generated from the download of the UE to the first flow regenerator 126. In one embodiment, a packet stream is compressed by an application 118 or a compression component (not shown) at the base station 112, 114 prior to the packet stream being transmitted to the first and second flow generators 126, 128. The first and second flow generators 126, 128 can also perform this compression operation as well.

In another embodiment, the application nodes performing the function of client, which are usually applications running on the UE 108, and the server, which is running in the base station 112, are replicated. For example, a virtual client is created in the first flow regenerator 126 and a virtual server is created in the second flow regenerator 128. The base station 112 replicates each request of the client that it receives (e.g., application running on the UE 108) to the virtual client in the first flow regenerator 126. In this embodiment, the application on the UE 108 is sending a request for content/services to the server 106. However, the virtual client and virtual server handle this captured request and related flow while maintaining the appearance to the UE that the request and packet flow are between the UE 108 and server 106.

In this embodiment, the virtual client mimics sending the request to the virtual server in the second flow regenerator 128 and the packets are marked so that the second flow regenerator 128 can extract them and send them to the virtual server. The virtual server sends a response that is identical to a request the application on the UE would have received from the sever 106 in response to its request. This response is marked by second flow regenerator 128 (or virtual server) and removed by the first flow regenerator 126 (or virtual client). The flow is regenerated between the point where legal interception or charging needs to be done. In alternative embodiments, the regenerated flow can only resemble the original flow in some limited aspects, e.g. have the same size of data that the original flow would have had but not necessarily having the exact same content. It should be noted that, in some situations, the virtual server is not required. For example, if the application on the UE 108 is just making a request to a website, the virtual client can make that same request and discard any response it gets.

In both of the above embodiments, the benefits of low latency applications are obtained while the flow remains unchanged from the legal interception/charging point of observation. It should be noted that, in some embodiments, a bandwidth compression mechanism is implemented between the base station 112 (or other node implementing ASPN functionality) and the two flow regenerators 126, 128 for terminating and ending the flow. This communication, which is not flowing on a user-identified traffic, does not impact the legal interception or charging functions within the network. The bandwidth compression mechanism allows the bandwidth flowing between the base station 112 (or other node implementing ASPN functionality) and the regeneration points 126, 128 to be reduced while allowing sufficient information to recreate the flow required for legal interception/charging functions. Once example of a bandwidth compression mechanism is byte caching as discussed in the commonly owned U.S. patent application Ser. No. 13/601, 306 entitled "Byte Caching In Wireless Communication Networks", which is hereby incorporated by reference in its entirety. It should be noted that other bandwidth compression mechanism as applicable as well.

Figure 5:
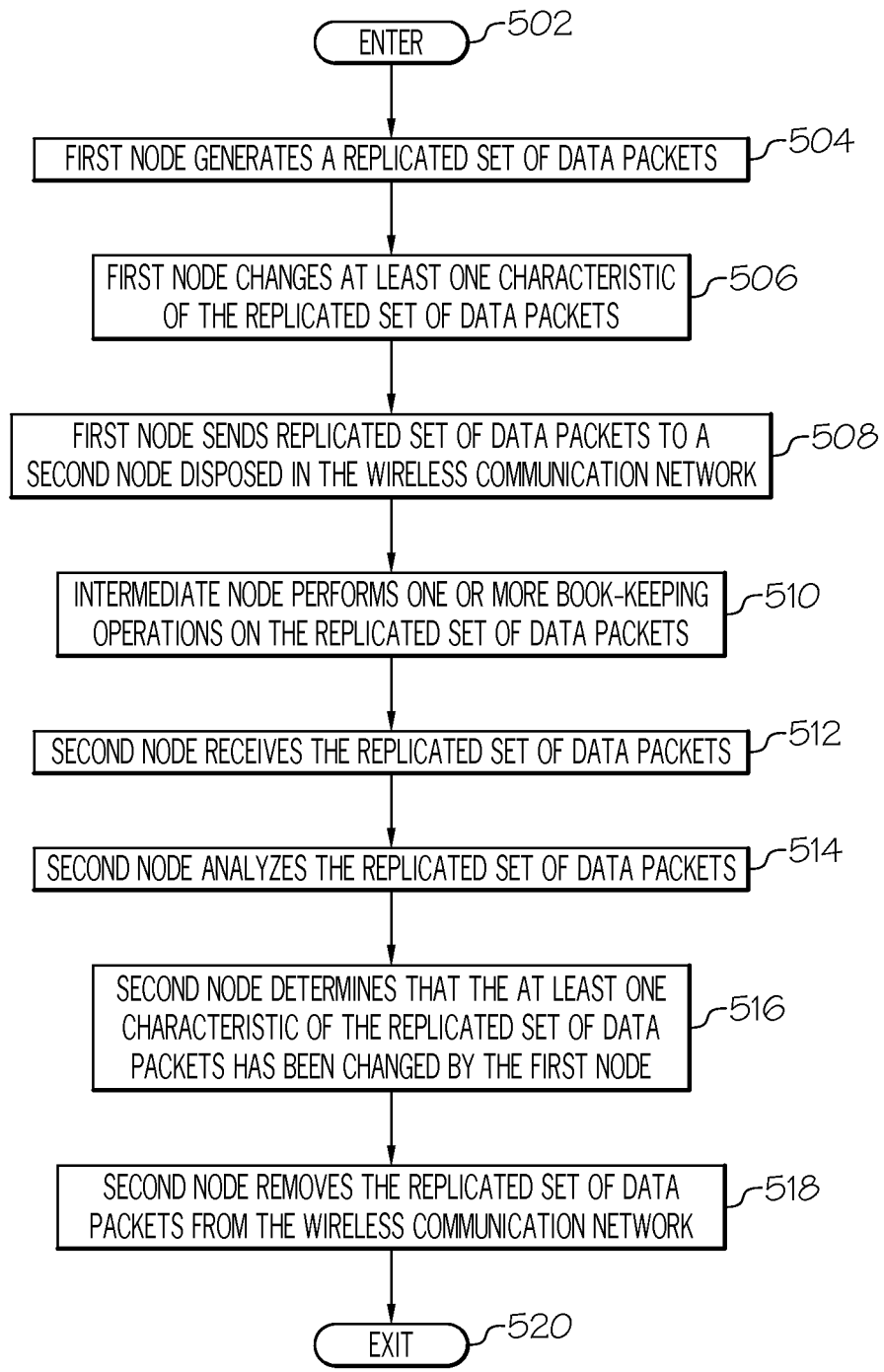
FIG. 5 is an operational flow diagram illustrating one example of managing data flow between at least one wireless communication device and at least one application executing at an edge of a wireless communication network according to one embodiment of the present disclosure.

FIG. 5 is an operational flow diagram illustrating one example of managing data flow between at least one wireless communication device and at least one application executing at an edge of a wireless communication network. The operational flow diagram of FIG. 5 begins at step 502 and flows directly to step 504. A first node disposed at an edge of a wireless communication network 102, at step 504, generates a replicated set of data packets. The replicated set of data packets are a copy of a set of data packets being transmitted between an application 118 disposed on the first node (or on another node) and a wireless communication device 108.

The first node, at step 506 changes at least one characteristic of the replicated set of data packets. The at least one characteristic that is changed indicates to a second node disposed in the wireless communication network 102 that the replicated set of data packets is to be removed from the wireless communication network 102. The first node, at step 508, sends the replicated set of data packets to the second node. The replicated set of data packets is sent to the second node through at least an intermediate (third) node disposed between the first and second nodes 112, 128. The intermediate node, at step 510, performs one or more book-keeping operations on the replicated set of data packets.

The second node, at step 512, receives the replicated set of data packets. The second node, at step 514, analyzes the replicated set of data packets. The second node, at step 516, determines that the at least one characteristic of the replicated set of data packets has been changed by the first node. The second node, at step 518, removes the replicated set of data packets from the wireless communication network. The control flow exits at step 520.

Referring now to FIG. 6, this figure is a block diagram illustrating an information processing system that can be utilized in embodiments of the present disclosure. The information processing system 602 is based upon a suitably configured processing system configured to implement one or more embodiments of the present disclosure (e.g., the base stations 112, 114, any node comprising the flow regenerators 126, 128, and/or the like). Any suitably configured processing system can be used as the information processing system 602 in embodiments of the present disclosure. The components of the information processing system 602 can include, but are not limited to, one or more processors or processing units 604, a system memory 606, and a bus 608 that couples various system components including the system memory 606 to the processor 604.

The bus 608 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 6, the main memory 606 includes the applications 118, the first flow regenerator 126, and/or the second flow regenerator 128. The local or global UE location managers 120, 122 can reside within the processor 604, or be a separate hardware component. The system memory 606 can also include computer system readable media in the form of volatile memory, such as random access memory (RAM) 610 and/or cache memory 612. The information processing system 602 can further include other removable/non-removable, volatile/non-volatile computer system storage media. By way of example only, a storage system 614 can be provided for reading from and writing to a non-removable or removable, non-volatile media such as one or more solid state disks and/or magnetic media (typically called a "hard drive"). A magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 608 by one or more data media interfaces. The memory 606 can include at least one program product having a set of program modules that are configured to carry out the functions of an embodiment of the present disclosure.

Program/utility 616, having a set of program modules 618, may be stored in memory 606 by way of example, and not limitation, as well as an operating system, one or more application programs, other program modules, and program data. Each of the operating system, one or more application programs, other program modules, and program data or some combination thereof, may include an implementation of a networking environment. Program modules 618 generally carry out the functions and/or methodologies of embodiments of the present disclosure.

The information processing system 602 can also communicate with one or more external devices 620 such as a keyboard, a pointing device, a display 622, etc.; one or more devices that enable a user to interact with the information processing system 602; and/or any devices (e.g., network card, modem, etc.) that enable computer system/server 602 to communicate with one or more other computing devices. Such communication can occur via I/O interfaces 624. Still yet, the information processing system 602 can communicate with one or more networks such as a local area network (LAN), a general wide area network (WAN), and/or a public network (e.g., the Internet) via network adapter 626. As depicted, the network adapter 626 communicates with the other components of information processing system 602 via the bus 608. Other hardware and/or software components can also be used in conjunction with the information processing system 602. Examples include, but are not limited to: microcode, device drivers, redundant processing units, external disk drive arrays, RAID systems, tape drives, and data archival storage systems.

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A system for managing data flow between at least one wireless communication device and at least one application executing at an edge of a wireless communication network, the system comprising:
   a first information processing disposed at an edge of a wireless communication network, the first information processing system comprising
      memory;
      a processor communicatively coupled to the memory;
      at least one application;
      a first flow regenerator communicatively coupled to the memory and the processor, the first flow regenerator being configured to perform a method comprising
         generating a replicated set of data packets, where the replicated set of data packets are a copy of a set of data packets being transmitted between the application and a wireless communication device;
         changing at least one characteristic of the replicated set of data packets, where the at least one characteristic that is changed indicates to a second flow regenerator that the replicated set of data packets is to be removed from the wireless communication network; and
         sending the replicated set of data packets to the second flow regenerator disposed in the wireless communication network, the replicated set of data packets being sent to the second flow regenerator through a node disposed between the first flow regenerator and the second flow regenerator, where the node is configured to perform one or more book-keeping operations on the replicated set of data packets,
      wherein the one or more book-keeping operations comprises generating a set of call detail records for the replicated set of data packets, wherein each of the set of call detail records is a formatted measure of service usage by the wireless communication device;
   a second information processing system comprising the second flow regenerator, where the flow regenerator is configured to perform a method comprising:
      receiving the replicated set of data packets;
      analyzing the replicated set of data packets;
      determining that the at least one characteristic of the replicated set of data packets has been changed by the first flow regenerator; and
      removing the replicated set of data packets from the wireless communication network.

2. The system of claim 1, wherein the first information processing system is a base station.

3. The system of claim 1, wherein the set of data packets are being transmitted from one of:
   the wireless communication device to the application; and
   the application to the wireless communication device.

4. The system of claim 1, wherein the application is configured to
   receive a request for data from the wireless communication device;
   at least one of generate the data and obtain the data from the first information processing system based on receiving the request; and
   provide the data to the wireless communication device.

5. A computer program product for managing data flow between at least one wireless communication device and at least one application executing at an edge of a wireless communication network, the computer program product comprising:
   a storage medium readable by a processing circuit and storing instructions for execution by the processing circuit for performing a method comprising:
      generating, by a first flow regenerator disposed within a wireless communication network, a replicated set of data packets, where the replicated set of data packets are a copy of a set of data packets being transmitted between an application disposed on a first node at an edge of the wireless communication network and a wireless communication device;
      changing at least one characteristic of the replicated set of data packets, where the at least one characteristic that is changed indicates to the second flow regenerator that the replicated set of data packets is to be removed from the wireless communication network;
      sending, by the first flow regenerator, the replicated set of data packets to the second flow regenerator disposed in the wireless communication network, the replicated set of data packets being sent to the second flow regenerator through at least a second node disposed between the first flow regenerator and the second flow regenerator, where the second node is configured to perform one or more book-keeping operations on the replicated set of data packets, wherein the one or more book-keeping operations comprises generating a set of call detail records for the replicated set of data packets, wherein each of the set of call detail records is a formatted measure of service usage by the wireless communication device;
      receiving, by the second flow generator, the replicated set of data packets;
      analyzing, by the second flow generator, the replicated set of data packets;
      determining, by the second flow generator, that the at least one characteristic of the replicated set of data packets has been changed by the first flow regenerator; and
      removing, by the second flow generator, the replicated set of data packets from the wireless communication network.

6. The computer program product of claim 5, wherein the first node is a base station.

7. The computer program product of claim 5, wherein the set of data packets are being transmitted from the wireless communication device to the application.

8. The computer program product of claim 5, wherein the set of data packets are being transmitted from the application to the wireless communication device.

9. The computer program product of claim 5, wherein the application is configured to
   receive a request for data from the wireless communication device;
   at least one of generate the data and obtain the data from the first flow regenerator based on receiving the request; and
   provide the data to the wireless communication device.

* * * * *